United States Patent [19]

Zausner

[11] Patent Number: 5,381,469

[45] Date of Patent: * Jan. 10, 1995

[54] TELEPHONE ANTI-THEFT DEVICE

[75] Inventor: Fredrick Zausner, Port Washington, N.Y.

[73] Assignees: Resco Metal Products Corp., Brooklyn; Renault Metal Products, Ltd., Middle Village, both of N.Y.

[*] Notice: The portion of the term of this patent subsequent to Sep. 15, 2009 has been disclaimed.

[21] Appl. No.: 852,527

[22] Filed: Mar. 17, 1992

Related U.S. Application Data

[63] Continuation of Ser. No. 526,514, May 21, 1990, Pat. No. 5,148,476.

[51] Int. Cl.6 .................. H04M 17/00; H04R 9/00; G07F 3/00
[52] U.S. Cl. .................. 379/143; 379/437; 379/440; 194/202
[58] Field of Search .............. 379/143, 437, 440, 145, 379/155; 194/202, 203, 204; 232/15, 57.5, 58, 66, 31

[56] References Cited

U.S. PATENT DOCUMENTS 3,213,210 10/1965 Samples ..................... 379/143
3,335,945 8/1967 Hutchins .
4,159,054 6/1979 Yoshida .
4,736,408 4/1988 Chen ..................... 379/155
4,763,352 9/1988 Goff ..................... 375/155 X

FOREIGN PATENT DOCUMENTS 2556155 12/1983 France ..................... 379/145

OTHER PUBLICATIONS

"Street Wis Pay Phone" *Popular Science*, Mar. 1992.

*Primary Examiner*—Stephen Chin
*Assistant Examiner*—Paul Loomis
*Attorney, Agent, or Firm*—Schweitzer Cornman & Gross

[57] ABSTRACT

A protective cover for the coinbox-containing portion of pay telephones of generally box-like construction, comprises a front panel flanked by a pair of parallel, rearwardly-extending side walls to define a generally U-shaped construction. The construction closely abuts the front and side panels of the telephone. The front panel is adapted to be permanently fastened to the coinbox cover of the telephone, such as by welding, and has an entryway to the telephone coin return slot and an integral raised portion positioned to overlie the top portion of the coin return door plate of the telephone.

8 Claims, 2 Drawing Sheets

TELEPHONE ANTI-THEFT DEVICE

This application is a continuation of application Ser. No. 526,514, filed May 21, 1990 U.S. Pat. No. 5,148,976.

The present invention relates to the mechanical arts, and in particular to a new and improved device intended to be utilized in conjunction with coin-operated, public telephones.

Damage due to vandalism of coin-operated telephones located in public places is substantial. In addition to the severing of wires to the phone and the removal of the handset, the fact that a coin-operated telephone can become the repository of a large number of coins makes the coinbox of the telephone a tempting target for robbery and vandalism. Efforts to strengthen the coinbox itself have met with only limited success, improvements in the strength of the box being limited by the nature and operation of the unit and normally being met with more aggressive techniques for the destruction of the telephone.

It has also been found that the coin return door is a target of such vandalism. While the doors are often designed to prevent the intentional jamming of the coin return path, to cause otherwise returned coins to be collected, followed by a release of the blockage to recover the coins, such doors are often disabled or removed by the vandal, who then replaces the door with a jamming device or a similar-appearing door which allows a jamming device to be used.

It is thus a purpose of the present invention to provide a protective shield for the coinbox and coin return path of pay telephones which provides increased security for the coinbox contents, as well as the coin return path.

Yet another purpose of the present invention is to provide such a device which may be utilized in connection with presently existing coin return, coinbox and telephone structures and which will not impede the normal and proper functioning of the telephone and the coin deposit and return mechanism.

BRIEF DESCRIPTION OF THE INVENTION

In accordance with the above and other objects, the present invention comprises a generally U-shaped plate of heavy gauge metal which overlies the bottom portion of the front surface of the telephone box, thus shielding the coinbox from entry. The sides of the device extend about the sides of the telephone, strengthening the structure and making it more difficult for the plate to be pried away from the box. The plate is fastened to the conventional coinbox cover plate in a tamper-proof, permanent manner and is provided with an appropriate opening to allow the cover plate lock key to be inserted when the coinbox is to be removed.

A significant feature of the present invention includes the provision of a raised portion on the front surface thereof to permit the coin return device to be activated in the normal manner. Accordingly, the coin return function is not compromised by the invention, while the invention provides increased protection for this otherwise vulnerable area, protecting the coin return door from tampering or removal.

BRIEF DESCRIPTION OF THE DRAWINGS

A fuller understanding of the present invention and the features and benefits thereof may be accomplished upon review of the following detailed description of a preferred, but nonetheless illustrative embodiment of the invention when taken in conjunction with the annexed drawings, wherein.

DETAILED DESCRIPTION OF A PREFERRED EMBODIMENT

Figure 1:
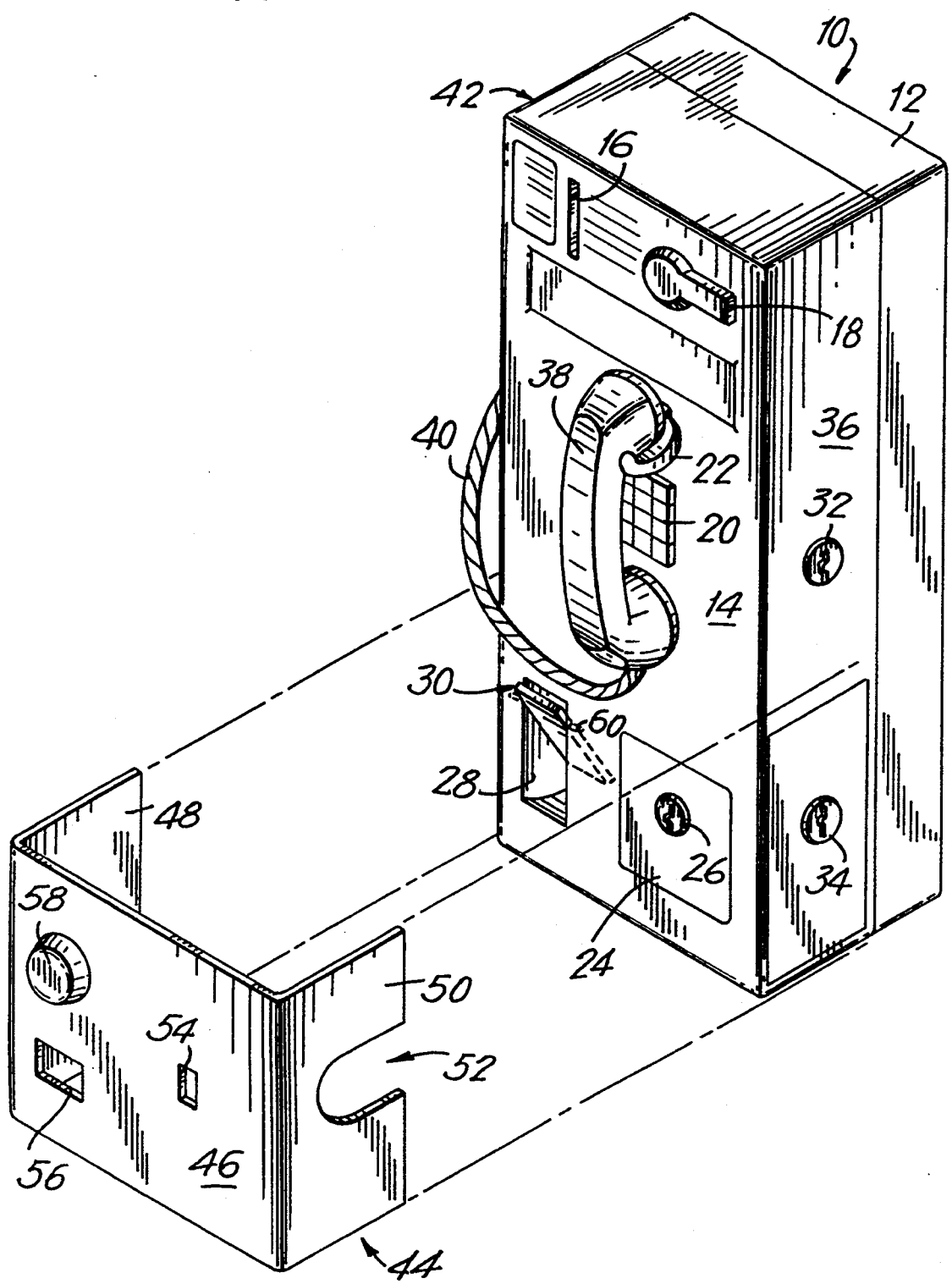
FIG. 1 is a perspective view of a typical coin telephone box with the protective cover of the invention shown displaced from the box, but in proper orientation for fitting thereon.

Referring initially to FIG. 1, pay telephone 10 is of conventional construction, and includes telephone box 12 having front panel 14 upon which coin slot 16, coin transport clearing lever 18, push-button array 20, headset cradle 22, coinbox access door plate 24, coinbox lock 26, coin return slot 28 and coin return slot cover 30 are located.

Additional key-operated lock elements 32 and 34 are located on a side 36 of the box to allow access to the unit's interior by authorized personnel, one of which locks, such as lock 34, normally functions in conjunction with coinbox lock 26 to allow access to the coinbox. A handset 38 rests in cradle 22, and is connected by cable 40, normally encased in a tamper-resistant shield to the third side 42 of the box.

The shield and protective plate 44 of the present invention is of generally U-shaped construction formed of heavy gauge metal, such as 0.145 inch thick stainless steel, having a front panel 46 flanked by side walls 48 and 50. The width of front panel portion 46 is such that side walls 48 and 50 closely embrace the sides 36 and 42 of the telephone box 12. The height of the plate is such that it fully overlies the lower portion of the telephone box 12, wherein the coinbox is located. As may be seen, side wall 50 is provided with a notch 52 adapted to allow access to the lock 34 and to permit the plate to be slid on and off the box 12 when a key is inserted into, and projects from the lock. An entranceway 54 is provided on the front panel 46 of the plate to allow access to coinbox lock 26.

Figure 2:
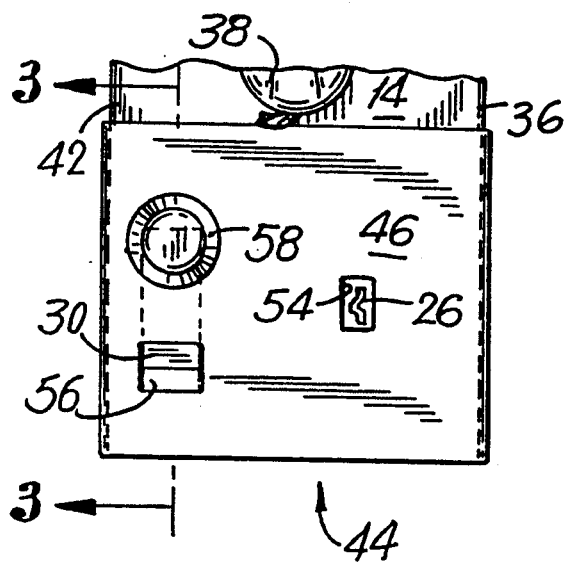
FIG. 2 is a partial front elevation view of the invention shown in place upon the phonebox body.
Figure 3:
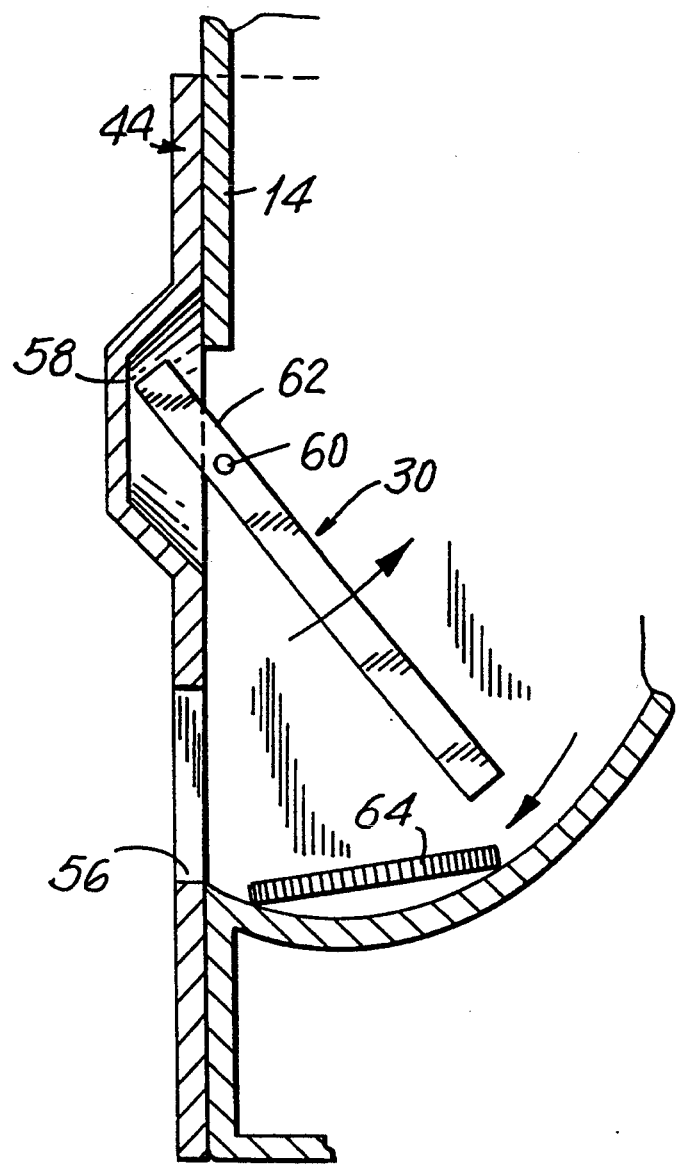
FIG. 3 is a partial section view taken along 3—3 of FIG. 2 detailing the construction of the cover to allow operation of the telephone coin return mechanism.

As further depicted in FIGS. 2 and 3 and, as detailed therein, the front panel 46 of protective plate 44 is further provided with an entryway 56, as well as a generally circular, raised portion 58 which allow the coin return mechanism, exemplified by the coin return slot and cover 28, 30 and clearing lever 18 to operate in the appropriate manner. The coin return mechanism of the telephone 10 includes a coin return slot cover 30 designed to pivot about pin 60 as shown in FIG. 3. This cover, which is shown in a generalized form in FIG. 3, is designed in part to foil attempts to direct wires and similar instrumentalities up through the coin slot 28 in an attempt to divert or otherwise retrieve inserted coins out through the slot. In operation, the upper portion 62 of the slot cover 30 pivots outwardly beyond the front surface 14 of the box when the lower portion of the cover is pushed inward to allow access to the interior of the coin return slot 28 and a returned coin 64.

Accordingly, front plate 46 has raised portion 58 which provides clearance for the upper portion 62 of the cover as it pivots outward. This raised portion, coupled with aperture 56 in the cover which is aligned with the lower portion of the coin return slot 28, allows full functioning of the coin return feature while providing security therefor. The raised portion 58 is preferably formed by a die forming process during cover fabrication.

Typically, the plate 44 is affixed, such as by welding, to the front of coinbox access plate 24. This retains the plate in position and allows it to be removed when the appropriate series of steps, including unlocking of the coinbox lock 26, occurs. Because the plate is affixed to the coinbox cover by welding, the plates can be fabricated and adapted to be used with boxes of otherwise conventional construction without great difficulty. The positioning of the elements on the front cover can be positioned during fabrication to accommodate differences which may appear in the location of the coinbox and coin return systems of telephone units of various manufacture. When in place, the plate provides maximum security for the coin storage and return portion of the telephone, while allowing full and proper operation of the unit.

What is claimed is:

1. A protective cover for a coin-operated telephone having a coin-return opening and a pivotly mounted protective cover in the region of said coin-return opening, comprising a protective plate dimensioned and configured to be attached to the telephone in the coin box and coin-return opening regions of the telephone; means to provide user access to the telephone coin-return opening and means to protect the upper portion of the coin-return protective pivotal door while permitting pivotal movement of said door to facilitate removal of coins from the coin-return opening of the telephone.

2. A protective cover according to claim 1, wherein said protective plate includes an access opening to permit user access to the coin-return opening of the telephone.

3. The protective cover according to claim 1, wherein said telephone includes a coin box for collection of user-deposited coins adjacent said coin-return opening, said protective plate extending across the frontal area of said telephone over the coin box and coin-return regions.

4. The protective cover according to claim 3, wherein said protective plate includes an access opening to permit user access to the coin-return opening of the telephone.

5. The protective cover assembly according to claim 3, wherein said coin box includes a lock and said protective plate includes an opening to permit key access to said lock.

6. A coin-operated telephone having a coin box for reception and accumulation of user deposited coins, a protective door extending over the forward portion of said coin box, lock means to permit selective removal of said protective door for authorized removal of the coins, coin return means for reception of coins intended to be returned to the user, and an opening which facilitates user access to said coin return means, which comprises:
a) a protective plate dimensioned to extend over the forward portion of the telephone in the coin box and coin return regions;
b) a pair of depending flanges extending rearwardly over side portions of the telephone to protect at least portions of the sides thereof;
c) means to attach said protective plate to the said protective door of said coin box such that said protective plate may be removed from the telephone by removal of said coin box protective door;
d) an aperture in said protective plate to provide key access to said lock of said coin box protective door;
e) an aperture in said protective plate to provide access to the user's finger to said coin return means to permit retrieval of coins retained to the user; and
f) integral means in said protective plate to permit forward pivotal movement of said coin return door and to limit said pivotal movement to a predetermined extent to provide protection to said coin return means.

7. The coin-operated telephone according to claim 6, wherein said means to attach said protective plate to the protective door of said coin box is a weld.

8. A method for protection of a coin-operated telephone from unauthorized removal of coins, the telephone having a coin box and coin return access opening adjacent the coin box region, a pivotal door to protect the coin return opening, which comprises:
a) providing a protective cover dimensioned to extend across the entire width of the telephone over the coin box and being constructed of material and of thickness which protects the telephone coin box from unauthorized entry and the pivotal coin return door while permitting forward pivotal movement of the upper portion; and
b) providing an opening in said protective cover directly over the coin return opening of the telephone, said opening being of sufficiently less dimensions than the coin return opening of the telephone so as to provide limited access to the coin return opening to protect the coin return opening from unauthorized entry.

* * * * *